(12) United States Patent
Kaiser et al.

(10) Patent No.: US 8,991,352 B2
(45) Date of Patent: Mar. 31, 2015

(54) INTAKE MANIFOLD SECTION AND INTAKE SYSTEM

(75) Inventors: Sven Alexander Kaiser, Waiblingen (DE); Gerald Combe, Wernau (DE); Konrad Kohler, Nürtingen (DE); Adolf Kremer, Remseck (DE); Martin Matt, Bruchsal (DE); Hans-Werner Schneider, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 13/510,238

(22) PCT Filed: Nov. 15, 2010

(86) PCT No.: PCT/EP2010/067484
§ 371 (c)(1),
(2), (4) Date: Aug. 6, 2012

(87) PCT Pub. No.: WO2011/061148
PCT Pub. Date: May 26, 2011

(65) Prior Publication Data
US 2012/0312270 A1    Dec. 13, 2012

(30) Foreign Application Priority Data
Nov. 17, 2009  (DE) .................. 10 2009 053 433

(51) Int. Cl.
*F02M 35/10*   (2006.01)
*F02M 25/06*   (2006.01)
(Continued)

(52) U.S. Cl.
CPC ......... *F02M 35/10222* (2013.01); *F02M 25/06* (2013.01); *G01F 1/684* (2013.01); *G01F 1/6842* (2013.01); *G01F 5/00* (2013.01); *G01F 15/185* (2013.01); *Y02T 10/121* (2013.01)

USPC ............... 123/184.21; 123/41.86; 123/184.27

(58) Field of Classification Search
CPC ............ F02M 25/06; F02M 35/10222; G01F 15/185; G01F 1/684; G01F 5/00
USPC ............ 123/184.21, 184.27, 184.55, 184.56, 123/184.22, 184.53, 41.86
See application file for complete search history.

(56) References Cited

U.S. PATENT DOCUMENTS 4,862,860 A    9/1989   Shinohara
5,081,962 A *  1/1992   Kurokawa et al. ....... 123/184.36
(Continued)

FOREIGN PATENT DOCUMENTS

DE    4229408 C1    8/1993
DE    19827330 C1   9/1999
(Continued)

OTHER PUBLICATIONS

Machine translation of DE 19827330, see attached document "DE19827330_Translation.pdf".*
(Continued)

*Primary Examiner* — Noah Kamen
*Assistant Examiner* — Long T Tran
(74) *Attorney, Agent, or Firm* — Rader, Fishman & Grauer PLLC

(57) ABSTRACT

An intake manifold section for installing in an intake system of an internal combustion engine may have a tube body including an inlet opening, an outlet opening and a fresh air path section running from the inlet opening to the outlet opening. An air mass sensor may be fastened to the tube body and protrude into the fresh air path section. A bypass channel may be disposed on the tube body and bypass the fresh air path section connected to a blow-by gas path at an inlet side.

15 Claims, 2 Drawing Sheets

(51) Int. Cl.
*G01F 1/684* (2006.01)
*G01F 5/00* (2006.01)
*G01F 15/18* (2006.01)

(56) References Cited

U.S. PATENT DOCUMENTS

| | | | | |
|---|---|---|---|---|
| 5,383,356 | A * | 1/1995 | Zurek et al. | 73/114.33 |
| 5,477,819 | A * | 12/1995 | Kopec | 123/184.42 |
| 5,797,380 | A * | 8/1998 | Tada et al. | 123/572 |
| 6,012,432 | A * | 1/2000 | Igarashi et al. | 123/494 |
| 6,167,855 | B1 * | 1/2001 | Mammarella et al. | 123/90.38 |
| 6,173,701 | B1 * | 1/2001 | Azuma | 123/568.17 |
| 6,729,316 | B1 * | 5/2004 | Knowles | 123/572 |
| 7,182,074 | B1 * | 2/2007 | Redon et al. | 123/568.12 |
| 7,296,563 | B2 * | 11/2007 | Yakabe et al. | 123/568.17 |
| 7,302,843 | B2 * | 12/2007 | Bender | 73/202.5 |
| 7,360,519 | B2 * | 4/2008 | Asfaw et al. | 123/184.61 |
| 7,438,047 | B2 * | 10/2008 | Kawasaki et al. | 123/337 |
| 7,596,991 | B2 * | 10/2009 | Redon | 73/114.31 |
| 7,934,419 | B2 * | 5/2011 | Saito et al. | 73/114.37 |
| 2003/0136368 | A1 * | 7/2003 | Ausiello et al. | 123/184.21 |
| 2005/0235940 | A1 * | 10/2005 | Shimatsu | 123/184.21 |
| 2009/0126670 | A1 * | 5/2009 | Kado et al. | 123/184.21 |
| 2010/0154736 | A1 * | 6/2010 | Ohzono | 123/198 E |
| 2012/0103296 | A1 * | 5/2012 | Konakawa et al. | 123/184.56 |
| 2012/0198925 | A1 * | 8/2012 | Saito et al. | 73/114.33 |

FOREIGN PATENT DOCUMENTS

| | | |
|---|---|---|
| DE | 19827330 C1 * | 9/1999 |
| DE | 102005057574 A1 | 6/2007 |
| EP | 0664390 A1 | 7/1995 |
| JP | 10-274026 | 10/1998 |
| JP | 2003-049719 A | 2/2003 |
| WO | WO-0163220 A2 | 8/2001 |

OTHER PUBLICATIONS

Machine translation of DE19827330, see "DE19827330_MachineTranslation.pdf".*
English abstract for DE-4229408.
English abstract for DE-19827330.
English abstract for DE-102005057574.
English abstract for JP-10-274026.
English abstract for JP-2003-049719.
English translation of JP OA for 2012-539288, dated Apr. 22, 2014.

* cited by examiner

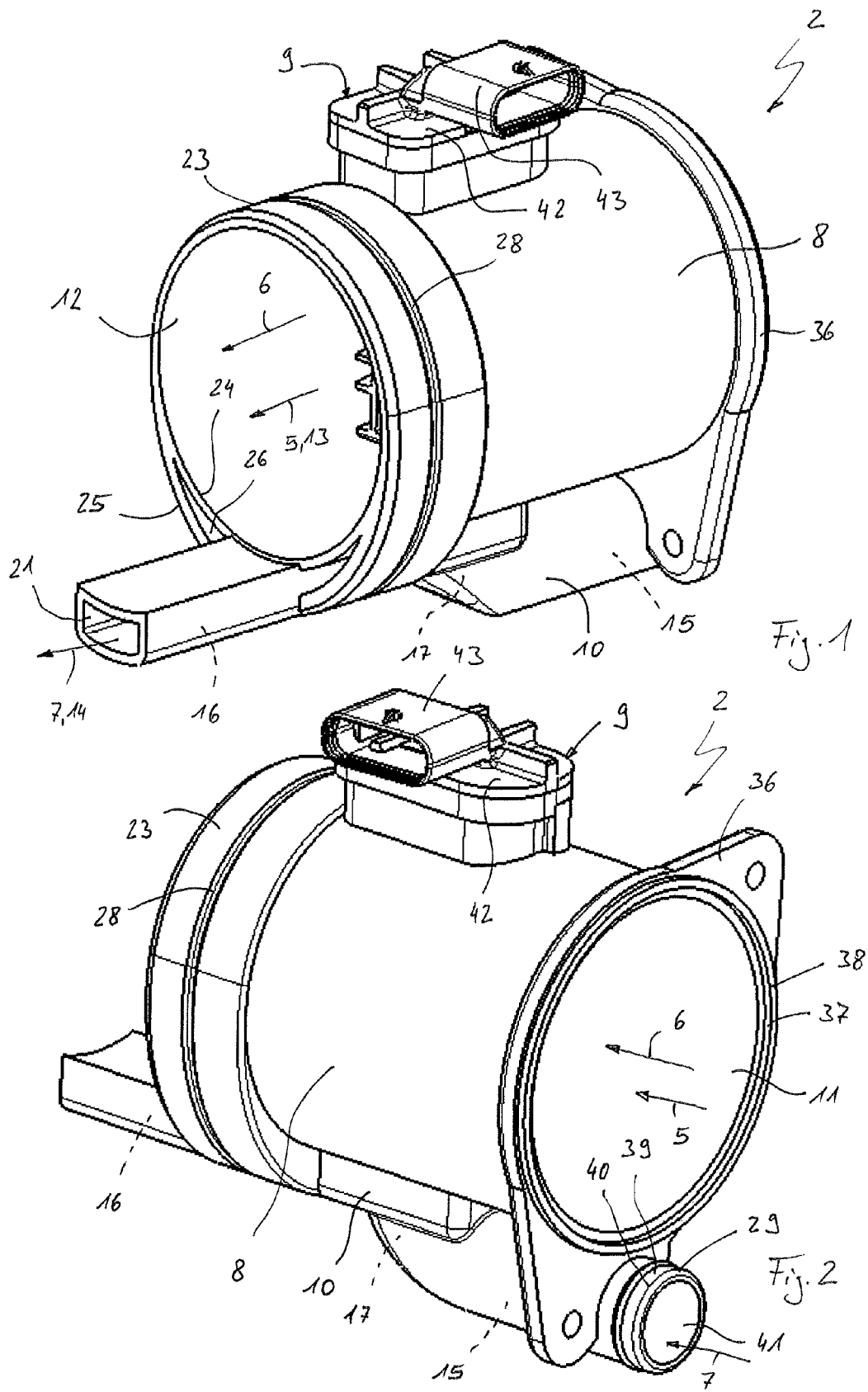

INTAKE MANIFOLD SECTION AND INTAKE SYSTEM

CROSS-REFERENCE TO RELATED APPLICATIONS

This application claims priority to German Patent Application 10 2009 053 433.4 filed on Nov. 17, 2009 and PCT/EP2010/067484 filed on Nov. 15, 2010, which are hereby incorporated by reference in their entireties.

TECHNICAL FIELD

The present invention relates to an intake manifold section for installing in an intake system of an internal combustion engine, in particular of a motor vehicle. In addition, the invention relates to an intake system of an internal combustion engine, in particular of a motor vehicle, which is equipped with such an intake manifold section.

BACKGROUND

An intake system for the supply of fresh air of an internal combustion engine is usually equipped with an air mass sensor, by means of which a motor control cooperates, in order to be able to operate the internal combustion engine according to requirements. For example, parameters for the fuel injection, for a throttle valve, for valve control times, for an exhaust gas return and suchlike depend on the air mass which is supplied at a particular moment. Such an air mass sensor, which in particular can be configured as a hot film sensor, is comparatively sensitive with respect to impurities. Accordingly, the air mass sensor in the intake system is usually arranged downstream of an air filter. Furthermore, it is usual to introduce blow-by gases downstream of the air mass sensor, which are returned from a crankcase of the internal combustion engine into the intake system.

For the return of the blow-by gases, it is basically possible to connect to the intake system a hose originating from the crankcase or from a cylinder-head cover. This can entail a comparatively high expenditure.

SUMMARY

The present invention is concerned with the problem of indicating for an intake system of the type named in the introduction or respectively for an associated intake manifold section, an improved or at least a different embodiment, which is distinguished in particular in that a simplified mounting and/or production and/or functional reliability is produced.

This problem is solved according to the invention by the subjects of the independent claims. Advantageous embodiments are the subject of the dependent claims.

The invention is based on the general idea of equipping a tube body, which is able to be installed in the intake system, on the one hand with the air mass sensor and on the other hand with a bypass channel, wherein the bypass channel on the one hand is able to be connected to a blow-by gas path, and on the other hand bypasses a fresh air path section running in the tube body. The blow-by gas path directs blow-by gas from the crankcase or respectively from a cylinder-head cover to the intake system, wherein the introduction into the intake system now takes place in accordance with the proposal according to the invention via the bypass channel of the tube body. The fresh air path is guided through the tube body. The air mass sensor protrudes into this fresh air path within the tube body.

Through the invention therefore an intake manifold section is provided which is able to be produced separately from the remaining intake system and which comprises the tube body with the air mass sensor and the bypass channel. Through this integral construction method, the introduction of the blow-by gas downstream of the air mass sensor can be ensured in a particularly simple manner. However, the factor is particularly advantageous that the connections by which the intake manifold section is integrated into the intake system can be configured particularly simply so that on the one hand the linking to the fresh air path of the intake system and on the other hand the linking to the blow-by gas path, are able to be realized more simply, wherein in particular a simultaneous connectability of the different paths is able to be realized. Furthermore, an integration of the two connection sites on the inlet side into a shared interface is also conceivable.

An embodiment is particularly advantageous here in which the bypass channel is formed integrally on the tube body. In particular, a manufacture of the tube body is conceivable with the bypass channel of plastic, in particular as a single-piece injection-moulded part.

For a simplified mounting of the intake manifold section on the intake system, the tube body can be connectable by its inlet opening to an outlet of a component of the intake system on the inflow side and can be connectable by its outlet opening to an inlet of a component of the intake system on the outflow side. In particular, defined interfaces can be thereby created, which simplify the integration or respectively the installation of the intake manifold section into the intake system.

According to a particularly advantageous further development, provision can now be made that the bypass channel opens on the outlet side into the component of the intake system on the outflow side. In other words, after the installation of the intake manifold section into the intake system, both the fresh air path section of the tube body and also the bypass channel open into the component of the intake system on the outflow side. In particular a shared connection site or respectively interface is produced thereby, which connects the intake manifold section with the component of the intake system on the outflow side, wherein at the same time the fresh air path and the bypass channel open into this component on the outflow side, whereby in this component on the outflow side the admixing or respectively introducing of the returned blow-by gases to the fresh air flow takes place.

According to another advantageous embodiment, the bypass channel can project on the outlet side in the fresh air flow direction over the outlet opening of the tube body. Hereby, the risk of a return flow of blow-by gas to the air mass sensor can be reduced.

The intake manifold section proposed according to the invention makes it possible in particular to equip the bypass channel on the inlet side with a connection piece which is able to be connected to an outlet of the blow-by gas path, wherein basically any desired configurations are conceivable for this outlet. For example, the said outlet can be arranged on a component of the intake system on the inflow side and in particular can even be formed integrally thereon. The connection piece of the bypass channel can also be used for example for connecting a hose, via which the blow-by gas is returned. For this, corresponding coupling means can be used, which enable a mounting and dismantling of the hose. Alternatively, it is likewise conceivable to securely arrange or respectively to pre-mount a hose on the connection piece of the bypass channel, which hose then on installation of the intake manifold section can be connected at its inlet end with the crankcase or respectively with the cylinder-head cover. For example, such a hose can be welded or coiled onto the connection piece of the bypass channel.

Further important features and advantages of the invention will emerge from the subclaims, from the drawings and from the associated figure description with the aid of the drawings.

It shall be understood that the features mentioned above and to be explained in further detail below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically

FIG. 1 a perspective view of an intake manifold section,

FIG. 2 a perspective view as in FIG. 1, but from a different viewing direction,

DETAILED DESCRIPTION

Figure 3:
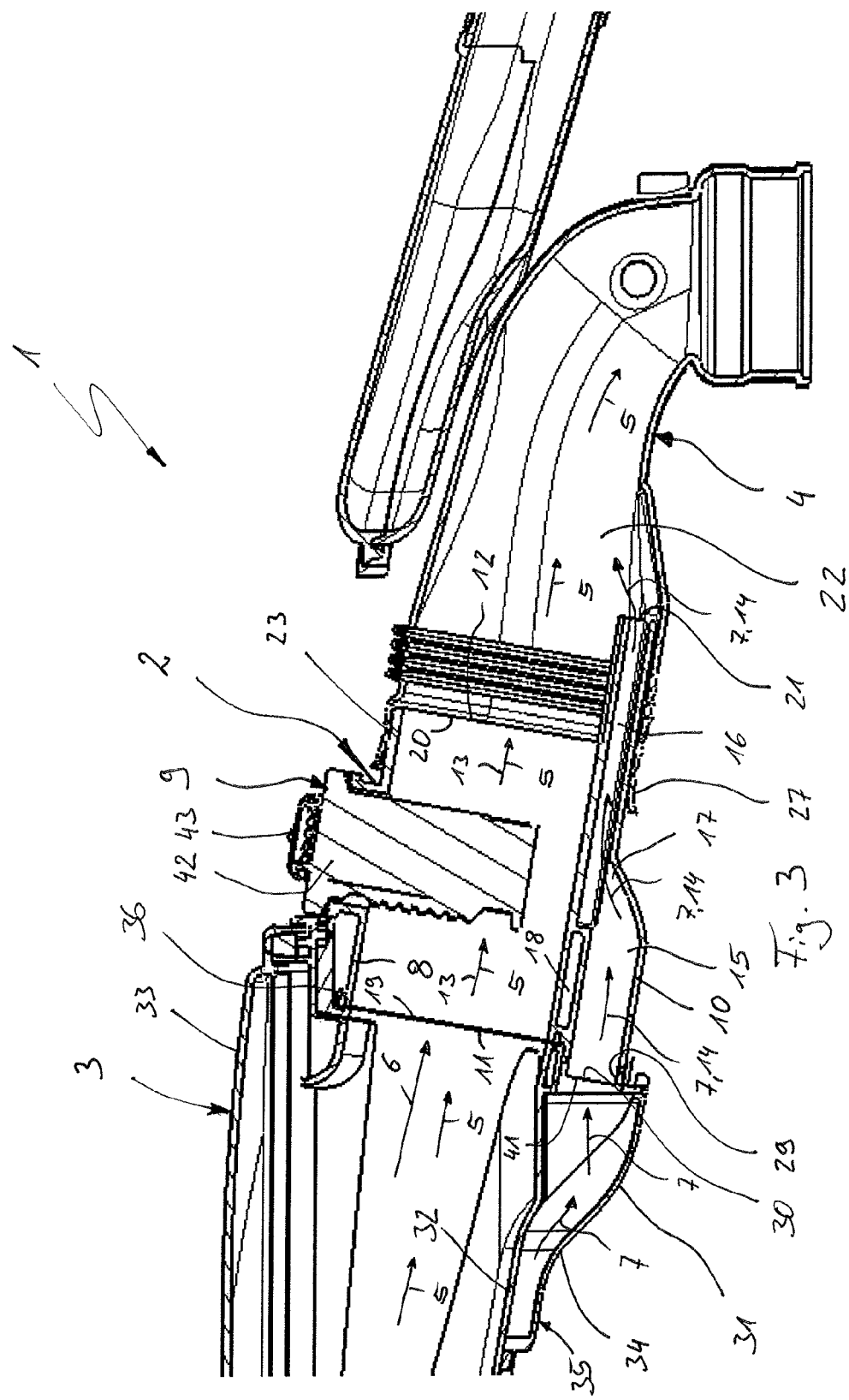
FIG. 3 a longitudinal section of an intake system in the region of the intake manifold section.

In accordance with FIG. 3, an intake system 1, which is illustrated only partially, which serves for the fresh air supply of an internal combustion engine which is not illustrated, which can be arranged in particular in a motor vehicle, comprises an intake manifold section 2 and at least one component 3 on the inflow side, and at least one component 4 on the outflow side. In FIG. 3 a fresh air path 5 is indicated by arrows. In addition, a flow direction 6 of a fresh air flow, following the fresh air path 5, is indicated by an arrow. Accordingly, the component 3 on the inflow side is arranged upstream of the intake manifold section 2 with respect to the flow direction 6, whilst the component 4 on the outflow side is arranged downstream of the intake manifold section 2 with respect to the flow direction 6.

In the example which is shown, in addition a blow-by gas path 7, which is likewise indicated by arrows, runs in the region of the component 3 on the inflow side.

In accordance with FIGS. 1 to 3, the intake manifold section 2 comprises a tube body 8, an air mass sensor 9 and a bypass channel 10. The tube body 8 has an inlet opening 11 and an outlet opening 12 and comprises a fresh air path section 13, which is indicated by arrows in FIG. 3 and leads from the inlet opening 11 to the outlet opening 12. In the mounted state of FIG. 3, the fresh air path section 13 of the tube body 8 is integrated into the fresh air path 5 of the intake system 1.

The air mass sensor 9, which can preferably be a hot film sensor, is fastened to the tube body 8 and protrudes into the fresh air path section 13.

The bypass channel 10 is arranged on the tube body 8 and bypasses the fresh air path section 13. In addition, the bypass channel 10 is able to be connected on the inlet side to the blow-by gas path 7. In the mounted state, the bypass channel 10 guides an end section 14 of the blow-by gas path 7. In this respect, the blow-by gas path 7 and said blow-by gas path end section 14 coincide in the bypass channel 10.

The bypass channel 10 is arranged externally on the tube body 8, whilst the fresh air path section 13 runs or respectively is guided internally in the tube body 8. The embodiment shown here is particularly advantageous, in which the bypass channel 10 is formed integrally on the tube body 8. Preferably, the tube body 8 and the bypass channel 10 are made from plastic and are designed as an injection moulded part. In the example of the FIGS. 1-3 shown here, the bypass channel 10 has an inlet section 15 which has, for example, a circular cross-section, and an outlet section 16, which can have a cross-section deviating from the inlet section 15. In the example, the flow cross-section of the outlet section 16 is substantially rectangular, wherein this "rectangular shape" is slightly curved, which can be seen from FIGS. 1 and 2. A transition section 17 connects the inlet section 15 with the outlet section 16 and carries the inlet cross-section, in particular continuously, over into the outlet cross-section. In the illustrated example embodiment, the outlet section 16 is embodied integrally with the intake manifold section 2. According to another embodiment, the outlet section 16 can also be embodied as a separate component and can be fitted, welded or screwed onto the inlet section 15. Furthermore, the separate component can be formed from a flexible component, in particular from a flexible hose. Consequently, the outlet section 16 can be embodied longer and/or bent. In the region of the inlet section 15, a gap 18 can be provided between the bypass channel 10 and the tube body 8.

In accordance with FIG. 3, the pipe body 8 is connected by its inlet opening 11 onto an outlet 19 of the component 3 on the inflow side, whilst it is connected by its outlet opening 12 onto an inlet 20 of the component 4 on the outflow side. Expediently, provision can now be made that the bypass channel 10 according to FIG. 3 opens on the outlet side, i.e. here with its outlet section 16, into the component 4 on the outflow side. In other words, an outlet opening 21 of the bypass channel 10 opens into the component 4 on the outflow side. Accordingly, returned blow-by gas can enter there into the fresh air flow of the intake system 1. As a result, an admixing of blow-by gas to the fresh air occurs in a region 22. As can be seen, this admixing site 22 is situated downstream of the air mass sensor 9, whereby a contamination of the air mass sensor 9 by returned blow-by gas can be avoided. The embodiment shown here is particularly advantageous in which the bypass channel 10 projects on the outlet side in the flow direction 6 of the fresh air flow over the outlet opening 12 of the tube body 8. In the example, the outlet section 16 protrudes significantly over the end of the tube body 8 on the outlet side. For example, the bypass channel 10 projects by at least 30%, here approximately by 50%, of the axial length of the tube body 8 on the downstream side over the tube body 8. This provision distinctly reduces the risk of a return flow of blow-by gas to the air mass sensor 9.

The tube body 8 is expediently equipped with an outlet connection 23 on the outlet side, via which it can be connected with the component 4 on the outflow side. This outlet connection 23 surrounds or respectively encompasses here the outlet opening 12 of the tube body 8 and the outlet section 16 of the bypass channel 10. As can be seen in particular from FIG. 1, the outlet connection 23 can have an inner skin 24 for this, laterally delimiting the outlet opening 12, which inner skin has a round internal cross-section. In addition, the outlet connection 23 has an outer skin 25, surrounding the inner skin 24 and the bypass channel 10 or respectively the outlet section 16 of the bypass channel 10, which outer skin has a round external cross-section. The external cross-section is greater here than the internal cross-section, such that the bypass channel 10 can be arranged between the inner skin 24 and the outer skin 25. The inner skin 24 and outer skin 25 are arranged eccentrically with regard to their cross-sections, such that they are spaced at a maximum apart from each other in the region of the bypass channel 10, whilst they have their smallest distance from each other lying diametrically opposite thereto. Hereby, in the region of the bypass channel 10 a gap 26 occurs between the inner skin 24 and the outer skin 25, into which the bypass channel 10 is inserted or respectively fitted. Through this type of construction it is particularly simple to connect the outlet connection 23 of the tube body 8 with the component 4 on the outflow side. For example, for this a sleeve-shaped section 27 of the component 4 on the outflow side can be pushed externally onto the outlet connection 23, i.e. can be pushed externally onto the outer skin 25. This connection can be fixed for example by means of a clamp. In the example if FIGS. 1 and 2, the outlet connection 23 is equipped externally, i.e. on the outer skin 25, with an outer groove 28 encircling in a ring shape, into which a seal is able to be inserted. The internal cross-section is preferably circular, whilst the external cross-section is preferably elliptical or oval, or vice versa.

The bypass channel 10 can be equipped on the inlet side, i.e. at its inlet section 15 with a connection piece 29. The bypass channel 10 is able to be connected by this connection piece 29 to an outlet 30 of a blow-by gas line 31. This blow-by gas line 31 guides the blow-by gas path 7 up to the bypass channel 10. This outlet 30 or respectively a section of the blow-by gas line 31 having the outlet 30, can be arranged in accordance with the embodiment shown in FIG. 3 on the component 3 on the inflow side. This outlet 30 or respectively the section of the blow-by gas line 31 having the outlet 30 can be formed here in particular integrally on the component 3 on the inflow side.

In the example of FIG. 3 the blow-by gas line 31 is formed by a channel which on a side facing the fresh air path 5 is delimited by a wall section 32 of an air filter housing 33, and on a side facing away from the fresh air path 5 is delimited by a wall section 34 of a cylinder-head cover 35. In this case, the air filter housing 33 and the cylinder-head cover 35 form jointly the component 3 on the inflow side, to which the intake manifold section 2 is connected. Through this integral type of construction, it is possible in a particularly simple manner to provide a shared interface for the fresh air path 5 on the one hand and the blow-by gas path 7 on the other hand. For example, in the example which is shown, the intake manifold section 2 can be simply applied axially with its inlet end onto the component 3 on the inflow side, wherein the connection piece 29 penetrates into the blow-by gas line 31, which is configured as a channel, whilst an inlet flange 36 of the tube body 8 is connected on the front face with the component 3 on the inflow side or respectively with the air filter housing 33. This inlet flange 36 surrounds the inlet opening 19 and can be equipped for example with an axial seal 37, which is inserted into an axial groove 38 surrounding the inlet opening 11 in a ring shape. In this way, an axial seal is realized on the inlet flange 36. In contrast to this, a radial seal can be realized on the connection piece 29, by a ring seal 39 being inserted into a groove 40 encircling externally in a ring shape, which is arranged externally on the connection piece 29.

Deviating from the particular embodiment shown here, other embodiments are also conceivable for the connection of the bypass channel 10 to the blow-by gas path 7. For example, a hose can be coiled onto the connection piece 29, which hose then forms a part of the blow-by gas line 31. Likewise, it is possible to integrate an oil separator (not illustrated) into the blow-by gas path 7, the blow-by gas outlet of which then forms the outlet 30 to which the bypass channel 10 is able to be connected. Such an oil separator can be integrated for example into the component 3 on the inflow side and in particular into the air filter housing 33.

In the example shown here, the inlet opening 11 of the tube body 8 and an entry opening 41 of the bypass channel 10 have the same orientation, i.e. the planes in which the inlet opening 11 lies on the one hand and the entry opening 41 lies on the other hand, extend parallel to each other. The flow directions of fresh air on the one hand and blow-by gas on the other hand also extend in these openings 11, 41 substantially parallel to each other. Nevertheless, the inlet opening 11 and the entry opening 41 are separated from each other structurally or respectively are constructed spaced apart from each other on the tube body 8.

Hereby, a separate connecting of the tube body 8 or respectively of the intake manifold section 2 on the one hand to the fresh air path 5 and on the other hand to the blow-by gas path 7 is simplified.

In accordance with a preferred embodiment, the air mass sensor 9 has a housing 42 which can be glued or welded to the tube body 9. Hereby, a sufficient seal can be ensured between the housing 42 and the tube body 8. An embodiment is particularly advantageous in which the housing 42 and the tube body 8 are respectively produced from plastic, whereby it is possible in a particularly simple manner to weld the housing 42 to the tube body 8.

The air mass sensor 9 has, in addition, a connection 43 via which the air mass sensor 9 can be connected with a control or suchlike.

An embodiment is expedient in which the intake manifold section 2 forms a pre-mounted unit which is able to be produced separately from the remaining intake system 1 and can be installed particularly simply into the latter. The possibility is particularly expedient here of calibrating the air mass sensor 9 when it is already installed into the tube section 8, whilst the intake manifold section 2 itself is not yet installed into the intake system 1. In this way, the intake manifold section 2 can be installed with a calibrated air mass sensor 9 into the intake system 1. This leads to a considerable simplification on mounting of the intake system 1.

The invention claimed is:

1. An intake manifold section for installing in an intake system of an internal combustion engine, comprising:
    a tube body including an inlet opening, an outlet opening and a fresh air path section running from the inlet opening to the outlet opening,
    an air mass sensor fastened to the tube body and protruding into the fresh air path section, and
    a bypass channel disposed on the tube body and connected to a blow-by gas path upstream of the inlet opening of the tube body, the bypass channel being configured to enable a blow-by gas to bypass the fresh air path, exiting the bypass channel downstream of the outlet opening of the tube body;
    wherein the inlet opening of the tube body is connected to an outlet of an inlet component of the intake system on the inlet side,
    further wherein the outlet opening of the tube body is connected to an inlet of an outlet component of the intake system on an outlet side,
    further wherein the bypass channel opens on the outlet side into the outlet component on the outlet side,
    further wherein the tube body has an outlet connection on the outlet side, the outlet connection including the outlet opening and being configured to be connected to the outlet component of the intake system on the outlet side, and
    further wherein the bypass channel includes an outlet section.

2. The intake manifold section according to claim 1, wherein the bypass channel is formed integrally on the tube body.

3. The intake manifold section according to claim 1, wherein the outlet connection has an inner skin with a round internal cross-section laterally delimiting the outlet opening, and an outer skin with a round external cross-section surrounding the inner skin.

4. The intake manifold section according to claim 1, wherein the bypass channel has a connection piece on the inlet side, capable of being connected to a gas line outlet of a blow-by gas line guiding the blow-by gas path.

5. The intake manifold section according to claim 4,
wherein the outlet of the blow-by gas line is arranged on an inlet component of the intake system on the inlet side,
and further wherein the outlet of the blow-by gas line is formed integrally on the inlet component on the inlet side.

6. The intake manifold section according to claim 1,
wherein the air mass sensor has a housing and is at least one of glued and welded to the tube body,
and further wherein at least one of the tube body and the housing is produced from plastic.

7. The intake manifold section according to claim 1, wherein the intake manifold section is a pre-mounted unit, configured to be installed with a calibrated air mass sensor into the intake system.

8. The intake manifold section according to claim 1,
wherein the tube body is connectable to an outlet of an inlet component of the intake system at the inlet opening of the tube body, and to an inlet of an outlet component of the intake system at the outlet opening of the tube body, and
wherein the tube body has a shared connection site for connecting the tube body with the outlet component such that the fresh air path section of the tube body and the bypass channel open into the outlet component when the tube body is connected to the outlet component at the shared connection site.

9. The intake manifold section for installing in an intake system of an internal combustion engine, comprising:
a tube body including an inlet opening, an outlet opening and a fresh air path section running from the inlet opening to the outlet opening,
an air mass sensor fastened to the tube body and protruding into the fresh air path section, and
a bypass channel disposed on the tube body and connected to a blow-by gas path upstream of the inlet opening of the tube body, the bypass channel being configured to enable a blow-by gas to bypass the fresh air path, exiting the bypass channel downstream of the outlet opening of the tube body;
wherein the bypass channel projects over the outlet opening on the outlet side.

10. The intake manifold section according to claim 9, wherein the bypass channel projects by at least 30% of an axial length of the tube body.

11. An intake system for the fresh air supply of an internal combustion engine, comprising:
at least one intake manifold section having a tube body, an air mass sensor and a bypass channel, wherein the tube body includes an inlet opening, an outlet opening and a fresh air path section running from the inlet opening to the outlet opening,
further wherein the air mass sensor is fastened to the tube body and protrudes into the fresh air path section,
further wherein the bypass channel is disposed on the tube body and connected to a blow-by gas path upstream of the inlet opening of the tube body, the bypass channel being configured to enable a blow-by gas to bypass the fresh air path section, exiting the bypass channel downstream of the outlet opening of the tube body,
further wherein the inlet opening of the tube body is connected to an outlet of an inlet component of the intake system on the inlet side,
further wherein the outlet opening of the tube body is connected to an inlet of an outlet component of the intake system on an outlet side,
further wherein the bypass channel opens on the outlet side into the outlet component on the outlet side,
further wherein the tube body has an outlet connection on the outlet side, the outlet connection including the outlet opening and being configured to be connected to the outlet component of the intake system on the outlet side, and
further wherein the bypass channel includes an outlet section.

12. The intake manifold section according to claim 11, wherein the bypass channel is formed integrally on the tube body.

13. The intake manifold section according to claim 11, wherein the outlet connection has an inner skin with a round internal cross-section laterally delimiting the outlet opening, and an outer skin with a round external cross-section surrounding the inner skin.

14. The intake manifold section according to claim 11, wherein the bypass channel has a connection piece on the inlet side capable of being connected to a gas line outlet of a blow-by gas line guiding the blow-by gas path.

15. The intake manifold section according to claim 11, wherein the air mass sensor has a housing and is at least one of glued and welded to the tube body, and wherein at least one of the tube body and the housing is produced from plastic.

* * * * *